(12) United States Patent
Petro et al.

(10) Patent No.: US 7,516,419 B2
(45) Date of Patent: Apr. 7, 2009

(54) INFORMATION RETRIEVAL DEVICE

(75) Inventors: Oliver Petro, Hallein (AT); Evelyne Kanakis, Niederalm (AT); Stefan Michelitsch, Graz (AT)

(73) Assignee: Sony Corproation, Tokyo (JP)

( * ) Notice: Subject to any disclaimer, the term of this patent is extended or adjusted under 35 U.S.C. 154(b) by 548 days.

(21) Appl. No.: 10/996,241

(22) Filed: Nov. 23, 2004

(65) Prior Publication Data
US 2005/0183012 A1  Aug. 18, 2005

(30) Foreign Application Priority Data
Nov. 27, 2003  (EP)  ................... 03027416

(51) Int. Cl.
G06F 3/048 (2006.01)
G06F 3/033 (2006.01)
G09G 5/00 (2006.01)

(52) U.S. Cl. ................ 715/834; 345/184; 715/832
(58) Field of Classification Search ......... 715/832–834; 345/184
See application file for complete search history.

(56) References Cited

U.S. PATENT DOCUMENTS

| | | | | |
|---|---|---|---|---|
| 5,986,638 | A * | 11/1999 | Cheng | 715/857 |
| 6,072,483 | A * | 6/2000 | Rosin et al. | 715/716 |
| 6,448,987 | B1 * | 9/2002 | Easty et al. | 715/834 |
| 6,546,231 | B1 * | 4/2003 | Someya et al. | 455/550.1 |
| 6,549,219 | B2 * | 4/2003 | Selker | 715/834 |
| 6,920,445 | B2 * | 7/2005 | Bae | 707/2 |
| 7,093,201 | B2 * | 8/2006 | Duarte | 715/853 |
| 2002/0059271 | A1 * | 5/2002 | Bae | 707/100 |
| 2002/0122031 | A1 * | 9/2002 | Maglio et al. | 345/184 |
| 2002/0122072 | A1 | 9/2002 | Selker | 345/834 |
| 2005/0050476 | A1 * | 3/2005 | SanGiovanni | 715/834 |
| 2006/0164403 | A1 * | 7/2006 | Volckers | 345/184 |

FOREIGN PATENT DOCUMENTS

| | | |
|---|---|---|
| EP | 0 858 023 | 8/1998 |
| EP | 1 189 131 | 3/2002 |
| WO | WO 02/39712 | 5/2002 |

OTHER PUBLICATIONS

The Design and Implementation of Pie Menus, Dr. Dobb's Journal, Dec. 1991.*

* cited by examiner

Primary Examiner—William L Bashore
Assistant Examiner—Ashraf Zahr
(74) Attorney, Agent, or Firm—Oblon, Spivak, McClelland, Maier & Neustadt, P.C.

(57) ABSTRACT

An information retrieval device, including a jog-dial, a screen, a first level item processing unit to display at least a part of first level information items in a virtual ring segment on the screen, wherein first level information items are rotated and thereby the displayed first level information items are changed by rotating the jog-dial, and a first level capturing unit to select a first level information item that is displayed at a predetermined position by pressing the jog-dial. The information retrieval device also includes at least one respective further level information item processing unit to display at least a part of respective further level information items corresponding to an information item selected in the next lower level information items in a virtual ring segment around the virtual ring segment defined by the next lower level information items on the screen.

8 Claims, 2 Drawing Sheets

INFORMATION RETRIEVAL DEVICE

The present invention relates to an information retrieval device comprising a jog-dial and a screen.

Figure 3:
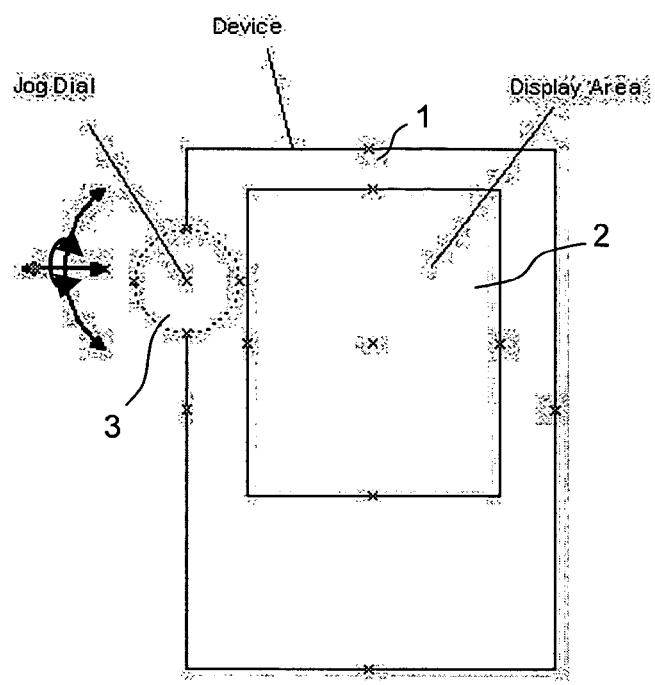

Devices that use a jog-dial for navigation within the items available on a display area and/or selection of such displayed items are generally known. Typically, all items are arranged on a virtual ring or ring segment and are partly visible and partly invisible. Such jog-dial navigation is e.g. implemented in products for 2.5 G and 3 G telecommunications networks. One of those products might implement a software application (Client-Server) on a mobile phone or another electronic device. As shown in FIG. 3, such a device 1 consists of a display 2 and a jog-dial 3 as main navigation and/or selection instruments. The jog-dial can generally be turned, tilted and pressed.

Figure 4:
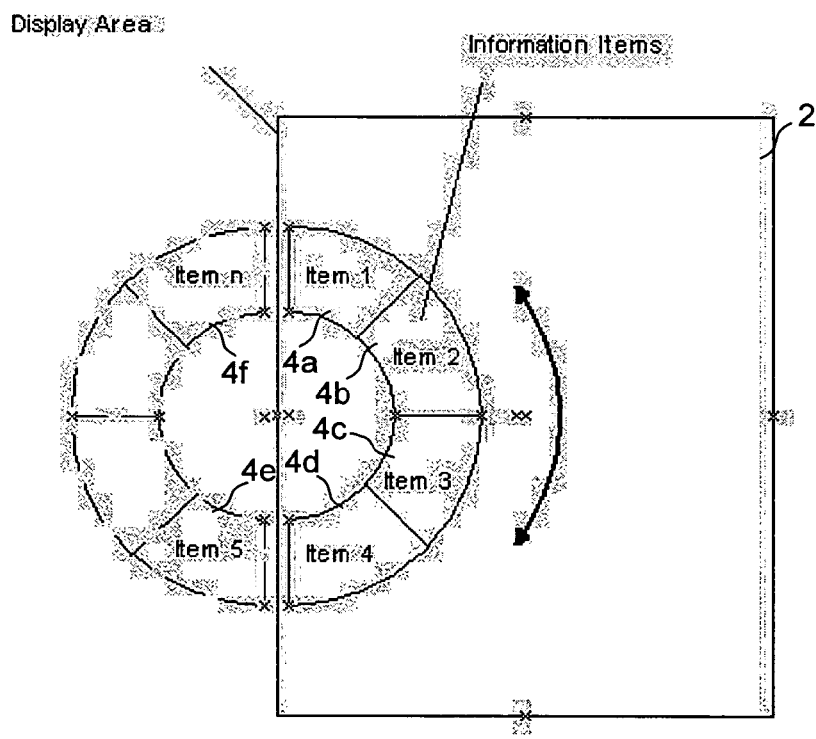

FIG. 4 shows the operation of the navigation within the items. The jog-dial 3 is used to spin a virtual ring of which a segment 4 is shown on the display 2. The ring segment 4 displays a part of the selectable items, here a first item 4a, a second item 4b, a third item 4c and a fourth item 4d. The virtual ring further comprises currently not-visible items, namely a fifth item 4e to an nth item 4f. By turning the jog-dial a displayed item disappears and a currently not visible item becomes visible, e.g.: in case wheel is spun clock-wise, the nth item 4f will be placed at the position of the first item 4a the first item 4a will be displayed at the position of the second item 4b, the second item 4b will be displayed at the position of the third item 4c, the third item 4c will be displayed at the position of the fourth item 4d, and the fourth item 4d will disappear.

Once an item is positioned at a predetermined position, e.g. the position in which the second item 4b is depicted in FIG. 4, and the jog-dial is pressed, the item that is positioned at the predetermined position is selected.

However, this described technique to use the jog-dial for selection of items is only suitable in case the number of included items allows the user to memorize the included items. Further, due to the usually more complex structure of items for information retrieval, the above-described technique to use the jog-dial is not satisfying.

Therefore, it is the subject underlying the present invention to provide a device and method that enables better using the jog-dial for information retrieval.

This object is solved by an information retrieval device according to independent claim 1 and by a method for information retrieval according to independent claim 5. Respective preferred embodiments thereof are respectively defined in the respective following sub-claims. A computer program product according to the present invention is defined in claim 9 and a computer accessible storage medium according to the present invention is defined in claim 10.

Therefore, an information retrieval device, comprising
a jog-dial,
a screen, and
a first level item processing unit to display at least a part of first level information items in a virtual ring segment on the screen, wherein said first level information items are rotated and thereby the displayed first level information items are changed by rotating the jog-dial, and
a first level capturing unit to select a first level information item that is displayed at a predetermined position by pressing the jog-dial, according to the present invention comprises
at least one respective further level information item processing unit to display at least a part of respective further level information items corresponding to an information item selected in the next lower level information items in a virtual ring segment around the virtual ring segment defined by the next lower level information items on the screen, wherein only the outermost displayed further level information items are rotated and thereby the outermost displayed further level information items are changed by rotating the jog-dial and all displayed lower level information items are kept static, and
at least one further level capturing unit to only select an outermost displayed further level information item that is displayed at a predetermined position by pressing the jog-dial and all displayed lower level information items are kept in their respective selected or not-selected state.

This information retrieval device according to the present invention therewith enables to display complicated structures of information items, by arranging these information items into subsets, sub-subsets, . . . , which can be selected and respectively be displayed. According to the invention, the navigation within said information items and their selection is as intuitive as that of the described existing jog-dial navigation and/or selection devices, in particular since every subset, sub-subset, . . . -identifier that is displayed as a respective lower level information item is still visible, but not moveable, since upon its selection all of the respective lower level information items are 'frozen' in their state upon selection of the subset, sub-subset, . . . -identifier and display of the corresponding higher level information items, i.e. the selected subset, sub-subset, . . . . The selection path that the user of the device selected might be seen as to represent the retrieved information.

In the information retrieval device according to the present invention preferably several respective highest level information items are selectable by pressing the jog-dial for a not-selected respective highest level information item and de-selectable by pressing the jog-dial for a selected respective highest level information item, and this preferred information retrieval device according to the present invention preferably comprises a storage unit for storing a selected and not-selected status of the respective highest level information items.

In other words, the information items to which no respective subset is assigned are displayed in an outermost ring segment and respectively can be selected and de-selected so that it is possible for a user to navigate to a particular 'last subset' of information items and select an arbitrary number thereof as well as to de-select selected information items thereof. The selected information items of the displayed highest order subset might be seen as to represent the retrieved information. Inherently also the selection path that the user of the device selected is included in the retrieved information, since the user somehow navigated to the particular highest order information items.

The information retrieval device according to this preferred embodiment therewith enables using a jog-dial for information retrieval by executing an information retrieval command based on selected information items on the outermost level of information items in a capturing unit and stored in a storage unit in addition to navigation among an infinite number of levels of information items using the jog-dial.

The information retrieval device according to the present invention alternatively or additionally preferably comprises a level control unit that causes a disappearing of the outermost displayed further level information items by tilting or double-pressing of the jog-dial.

Therewith, this preferred embodiment of an information retrieval device according to the present invention enables to make selections not only in one highest order subset, but in all highest order subsets, since after a selection of higher order information items a navigation back to the navigation items one or more orders below is possible. The selected information items of all highest order subset might then be seen as to represent the retrieved information.

Inherently also the selection path that the user of the device selected is included in the retrieved information, since the user somehow navigated to the selected highest order information items.

In the information retrieval device according to the present invention further alternatively or additionally preferably said jog-dial is arranged partly visible so that said ring segment(s) appear on said screen as to constitute a not-visible part of said jog-dial.

This preferred embodiment of an information retrieval device according to the present invention enables a particular intuitive operation of the jog-dial to select information items, since the user has the feeling of directly rotating the outermost displayed ring segment of information items.

Correspondingly, a method for information retrieval, comprising the steps of:
  displaying at least a part of first level information items in a virtual ring segment on a screen, wherein said first level information items are rotated and thereby the displayed first level information items are changed when a jog-dial is rotated, and
  selecting a first level information item that is displayed at a predetermined position when the jog-dial gets pressed, according to the present invention additionally comprises the steps:
  displaying at least a part of respective further level information items corresponding to an information item selected in the next lower level information items in a virtual ring segment around the virtual ring segment defined by the next lower level information items on the screen, wherein only the outermost displayed further level information items are rotated and thereby the outermost displayed further level information items are changed when the jog-dial is rotated and all displayed lower level information items are kept static, and
  only select a outermost displayed further level information item that is displayed at a predetermined position when the jog-dial gets pressed and all displayed lower level information items are kept in their respective selected or not-selected state.

Further correspondingly, the method according to the present invention preferably comprises the further steps:
  allowing that several respective highest level information items are selectable when the jog-dial gets pressed for a not-selected respective highest level information item and de-selectable when the jog-dial gets pressed for a selected respective highest level information item, and
  storing a selected and not-selected status of the respective highest level information items.

Still further correspondingly, the method according to the present invention preferably alternatively or additionally comprises the further step:
  causing a disappearing of the outermost displayed further level information items when the jog-dial gets tilted or double-pressed.

Still further correspondingly, the method according to the present invention further preferably alternatively or additionally comprises the further step:
  arranging said jog-dial partly visible so that said ring segment(s) appear on said screen as to constitute a not-visible part of said jog-dial.

A computer program product according to the present invention comprises computer program means adapted to perform the method steps as set-out above when being executed on a computer, digital signal processor or the like.

A computer readable storage means according to the present invention stores a computer program product as set-out above.

Figure 1:
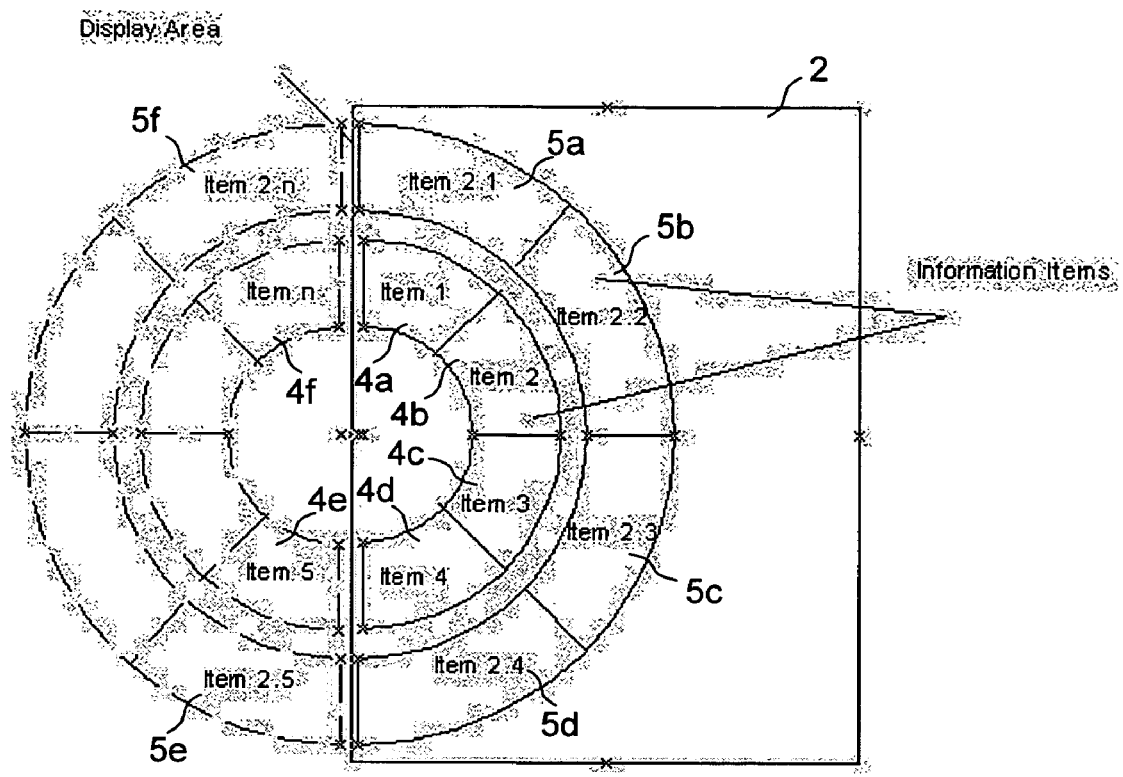
Figure 2:
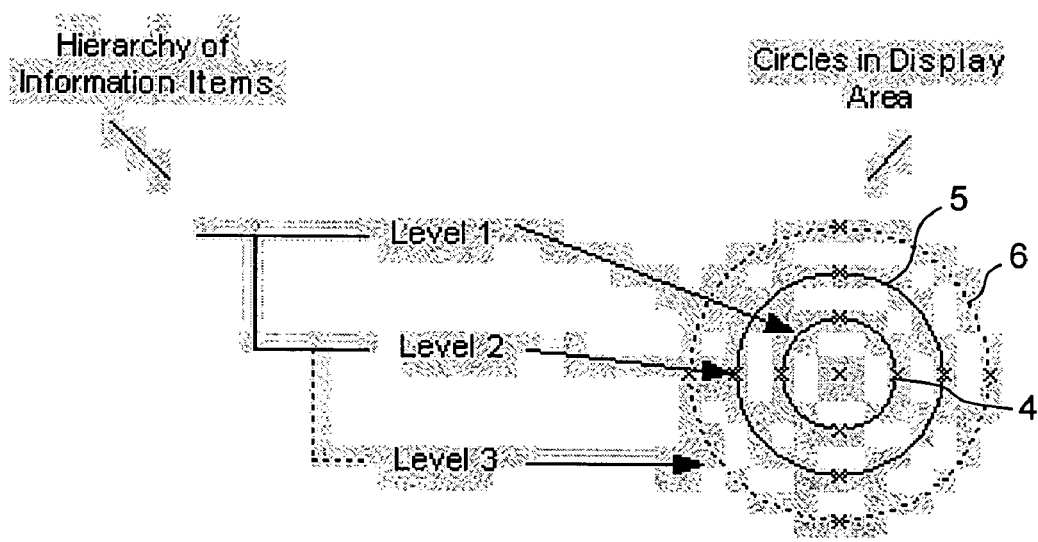

For a better understanding of the invention and to further elucidate the invention, its features, objects and advantages, an exemplary preferred embodiment thereof is described in detail by way of example while making reference to the accompanying drawing, wherein:

FIG. 1 shows an example of a display and an information item arrangement and structure of a two level content item retrieval device according to a preferred embodiment of the present invention, FIG. 2 shows an example of a display and an information item arrangement and structure of a three level content item retrieval device according to a preferred embodiment of the present invention, FIG. 3 shows an example of a jog-dial navigation and selection device according to the prior art, and FIG. 4 shows an example of a display and an information item arrangement and structure of a jog-dial navigation and selection device according to the prior art.

In the exemplary described embodiment of a two-level content item retrieval device according to the present invention, of which a possible display is shown in FIG. 1, the first level information items $4a$-$4f$ are identical to the items $4a$-$4f$ of the prior art device described in connection with FIG. 4. As is case of this prior art device, the first level information items $4a$-$4f$ are arranged on a virtual ring, of which a segment is shown, i.e. the first level information items $4a$-$4f$ are partly visible and partly invisible.

The not shown jog-dial is arranged as in the prior art device shown in FIG. 3 or preferably in the center of the virtual ring defining the first level information items $4a$-$4f$. It is used to spin the virtual rings of information items. Information items that are not visible currently are becoming visible then, as in case of the prior art device.

However, by pressing the jog-dial, not only a selection of the information item displayed at a particular position is performed, here of the second information item $4b$, but also based on the item selected in the inner circle, i.e. the lowest level or first level $4$, a subset of information items based on this selected second information item $4b$ is becoming visible within the display area, here the subset of first to nth second level information items $5a$-$5f$ corresponding to the selected second first level information item $4b$.

By rotating the Jog Dial, the user can browse the second level information items $5a$-$5f$, i.e. a first second level information item $5a$ corresponding to the second first level information item $4b$, a second second level information item $5b$ corresponding to the second first level information item $4b$, a third second level information item $5c$ corresponding to the second first level information item $4b$, a fourth second level information item $5d$ corresponding to the second first level information item $4b$, a fifth second level information item $5e$ corresponding to the second first level information item $4b$, . . . and an nth second level information item $5a$ corresponding to the second first level information item $4b$. The number n of information items of the first level and the subset corresponding to the second first level information item $4b$ needs not to be identical.

By pressing the jog-dial, the user can select one second level information item on the outer circle that is displayed at a particular position.

The steps of rotating and pressing can be repeated to select multiple second level information items on the outer circle, since the second level is the highest level in this embodiment.

By pressing the jog-dial when the information item has already been selected before, the information item is deselected.

By pressing the jog-dial twice in a short time period (double-click), the outer circle with its information items disappears, i.e. the displayed second level information items disappear. Then, the user can continue to use the jog-dial by browsing the inner circle, i.e. the first level information items.

EXAMPLE

| Inner Circle | Outer Circle |
| --- | --- |
| Music (selected by pressing Jog Dial) | Pop |
| Movies | Rock |
| News | Classics |
| TV Guide | Urban |
| Radio Program | — |

The information retrieval device according to the present invention can be used to navigate a hierarchy of information items and/or create a list of search parameters to retrieve information.

After a complete information sequence is selected, e.g. in the above example Music->Pop, then this information might get stored for later processing and/or directly processed to provide a display and/or direct access of the processing result. In the case of a selection of Music->Pop such a result could be a list of music items retrieved from the device into which the information retrieval device is incorporated or from a server with which the information retrieval device communicates. The list of music items could look like:

Coloursound: Fly with me
Shakira: Whenever, Wherever
Justin Timberlake: Senorita
50 Cent: In Da Club
...

and the single music items, e.g. songs, albums, collections, etc., could also be directly reproduced to the user. The information retrieval device according to the present invention therewith enables a user to more intuitively select information items with a jog-dial, since a categorization is enabled.

The navigation within a hierarchy of information items is shown in the following table by way of an example with 3 levels, as it is generally shown in FIG. 2, wherein not only two, but three half circles of information items are displayable, namely information items of a first level 4 as lowest level, of a second level 5 as intermediate level, and of a third level 6 as highest level.

| Level 1 | Level 2 | Level 3 |
| --- | --- | --- |
| Music | Channel 1 (selected) | Morning |
| Movies | Channel 2 | Afternoon |
| News | Channel 3 | Evening (selected) |
| TV Guide (selected) | Channel 4 | Night |

The navigation to create a list of search parameters to retrieve information is shown by way of the example of collecting search parameters for music that meet specific criteria, namely Genre=Pop OR Rock and Language=English in the following table:

| Level 1 (Inner Circle) | Level 2 (Outer Circle) |
| --- | --- |
| Genre (selected) | Pop (selected) |
| | Rock (selected) |
| | Classic |
| Tempo | Slow |
| | Medium |
| | Fast |
| Language (select) | English (selected) |
| | German |
| | French |

The actions necessary to perform this selection are:
Rotate Jog Dial to navigate to Genre on Inner Circle
Press Jog Dial to select Genre on Inner Circle
■ Outer Circle appears (Pop, Rock, Classics displayed)
Rotate Jog Dial to navigate to Pop on Outer Circle
Press Jog Dial to select Pop on Outer Circle
Rotate Jog Dial to navigate to Rock on Outer Circle
Press Jog Dial to select Rock on Outer Circle
Press Jog Dial twice
■ Outer Circle disappears
Rotate Jog Dial to navigate to Language on Inner Circle
Press Jog Dial to select to Language on Inner Circle
■ Outer Circle appears (English, German French)
Rotate Jog Dial to navigate to English on Outer Circle
Press Jog Dial to select English on Outer Circle

The invention claimed is:

1. An information retrieval device, comprising:
a jog-dial;
a screen;
a first level item processing unit configured to display at least a part of first level information items in a virtual ring segment on the screen, wherein said first level information items are rotated and the displayed first level information items are changed by rotating the jog-dial;
a first level capturing unit configured to select a first level information item that is displayed at a predetermined position by pressing the jog-dial;
at least one respective further level information item processing unit configured to display at least a part of respective further level information items corresponding to an information item selected in the next lower level information items in a virtual ring segment around the virtual ring segment defined by the next lower level information items on the screen, wherein only outermost displayed further level information items are rotated and the outermost displayed further level information items are changed by rotating the jog-dial and all displayed lower level information items are kept static, and
at least one further level capturing unit configured to only select an outermost displayed further level information item that is displayed at a predetermined position by pressing the jog-dial and all displayed lower level information items are kept in their respective selected or not-selected state,
wherein said jog-dial is arranged to be partly visible so that ring segments of the virtual ring segment that appear on said screen represent a non-visible part of said jog-dial.

2. The information retrieval device of claim 1, wherein several respective highest level information items are configured to be selected by pressing the jog-dial for a not-selected respective highest level information item and de-selected by pressing the jog-dial for a selected respective highest level information item, and including a storage unit configured to store a selected and not-selected status of the respective highest level information items.

3. The information retrieval device of claim 1, wherein a level control unit is configured to cause a disappearing of the outermost displayed further level information items by tilting or double-pressing of the jog-dial.

4. A method for information retrieval, comprising:
displaying at least a part of first level information items in a virtual ring segment on a screen, wherein said first level information items are rotated and the displayed first level information items are changed when a jog-dial is rotated, and
selecting a first level information item that is displayed at a predetermined position when the jog-dial is pressed;
displaying at least a part of respective further level information items corresponding to an information item selected in the next lower level information items in a virtual ring segment around the virtual ring segment defined by the next lower level information items on the screen, wherein only the outermost displayed further level information items are rotated and the outermost displayed further level information items are changed when the jog-dial is rotated and all displayed lower level information items are kept static; and
selecting only an outermost displayed further level information item that is displayed at a predetermined position when the jog-dial is pressed and all displayed lower level information items are kept in their respective selected or not-selected state,
wherein said jog-dial is arranged to be partly visible so that ring segments of the virtual ring segment that appear on said screen represent a non-visible part of said jog-dial.

5. The method according to claim 4, further comprising:
allowing several respective highest level information items to be selected when the jog-dial is pressed for a not-selected respective highest level information item and to be de-selected when the jog-dial is pressed for a selected respective highest level information item, and storing a selected and not-selected status of the respective highest level information items.

6. The method according to claim 4, further comprising:
causing a disappearing of the outermost displayed further level information items when the jog-dial gets tilted or double-pressed.

7. The method according to claim 4, further comprising:
arranging said jog-dial partly visible so that ring segments of the virtual ring segment appear on said screen as to constitute a not-visible part of said jog-dial.

8. A computer readable storage medium encoded with instructions, which when executed by a computer causes the computer to execute a method for information retrieval, comprising:
displaying at least a part of first level information items in a virtual ring segment on a screen, wherein said first level information items are rotated and the displayed first level information items are changed when a jog-dial is rotated, and
selecting a first level information item that is displayed at a predetermined position when the jog-dial is pressed;
displaying at least a part of respective further level information items corresponding to an information item selected in the next lower level information items in a virtual ring segment around the virtual ring segment defined by the next lower level information items on the screen, wherein only the outermost displayed further level information items are rotated and the outermost displayed further level information items are changed when the jog-dial is rotated and all displayed lower level information items are kept static; and
selecting only an outermost displayed further level information item that is displayed at a predetermined position when the jog-dial is pressed and all displayed lower level information items are kept in their respective selected or not-selected state,
wherein said jog-dial is arranged to be partly visible so that ring segments of the virtual ring segment that appear on said screen represent a non-visible part of said jog-dial.

* * * * *

UNITED STATES PATENT AND TRADEMARK OFFICE
CERTIFICATE OF CORRECTION

PATENT NO. : 7,516,419 B2  
APPLICATION NO. : 10/996241  
DATED : April 7, 2009  
INVENTOR(S) : Petro et al.

Page 1 of 1

It is certified that error appears in the above-identified patent and that said Letters Patent is hereby corrected as shown below:

On the title page, Item (73), the Assignee information is incorrect. Item (73) should read:

-- (73) Assignee:   Sony Corporation, Tokyo (JP) --

Signed and Sealed this

Nineteenth Day of May, 2009

JOHN DOLL  
*Acting Director of the United States Patent and Trademark Office*